March 17, 1970  F. E. LOVE  3,501,387
CONTINUOUS PROCESS FOR THE ELECTROLYTIC
PRODUCTION OF ALUMINUM
Filed July 11, 1967
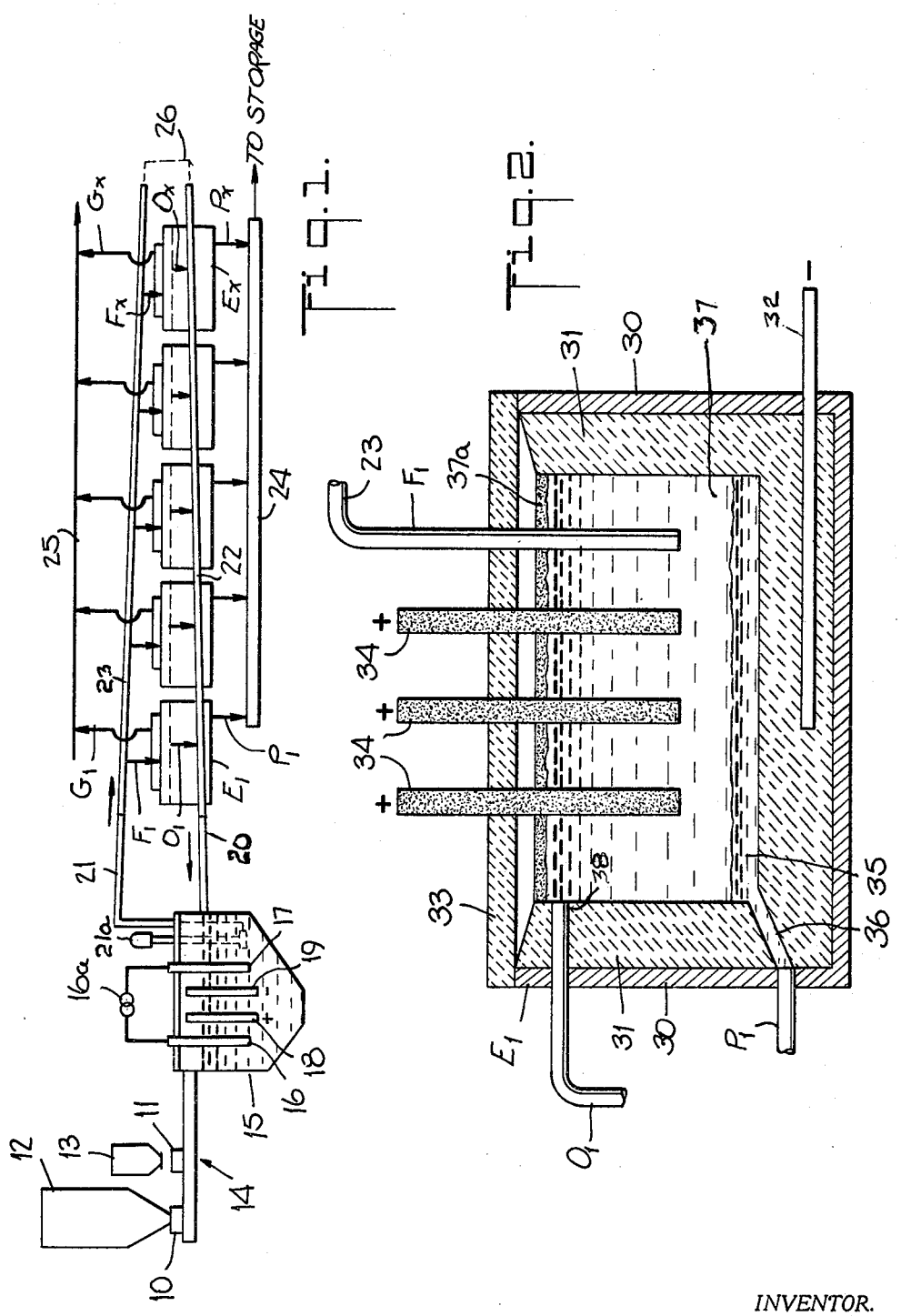
INVENTOR.
FRANK E. LOVE
BY
Ward, Haselton, McElhannon, Brooks & Fitzpatrick
ATTORNEYS 3,501,387
CONTINUOUS PROCESS FOR THE ELECTROLYTIC PRODUCTION OF ALUMINUM
Frank E. Love, Henderson, Nev., assignor to National Lead Company, New York, N.Y., a corporation of New Jersey
Filed July 11, 1967, Ser. No. 652,579
Int. Cl. C22d 3/12, 3/02
U.S. Cl. 204—67        7 Claims

ABSTRACT OF THE DISCLOSURE

Method and apparatus for producing aluminum metal by forming in a charging cell a feed solution of alumina in a molten solvent bath, introducing the feed solution to electrolysis cells and recirculating electrolysed solution from the cells to the charging cell therein to be replenished by and become part of the feed solution.

---

This invention relates to a continuous process for the production of high purity aluminum by the electrolytic decomposition of alumina.

The current commercially practised process for producing metallic aluminum involves the batch-wise operation of a series of electrolytic cells containing alumina dissolved in molten bath of natural or synthetic cryolite (a double fluoride of sodium and aluminum having the molecular formula $Na_3AlF_6$), and optionally the fluorides of other metals such as calcium, potassium, sodium and lithium. This molten mixture is subjected to electrolysis by the passage of direct current through carbon electrodes immersed in the electrolyte as anodes and the cell lining as a cathode. The electrolysis results in the decomposition of the dissolved alumina to form molten aluminum at the cathode and oxygen at the carbon anodes. The liberated oxygen reacts with the hot carbon anodes to form carbon dioxide and carbon monoxide which is drawn out of the cell. Eventually, the anodes are consumed and are replaced. The molten aluminum accumulates at the bottom of the cell and is intermittently tapped off. To some extent, the molten pool, as it accumulates, acts as a cathode itself.

The electrolytic decomposition is usually carried out at temperatures of around 900–1000° C. and characteristically a portion of the cryolite freezes as a crust over the molten bath. As alumina is depleted by the reaction, additional oxide must be added. This is generally achieved by distributing the alumina on top of the crust and breaking up the crust as needed. The peculiar characteristics of this type of operation, however, require frequent additions of alumina to each cell with attendant high labor costs. For example, as both alumina and anodes are consumed, the electrical resistance of the system tends to increase substantially during the normal course of operation. Since aluminum production is a function of current, a reduction in current to compensate for the increase in resistance will correspondingly decrease the amount of product. It is therefore desirable to operate at constant current. Constant current, however, with rising resistance causes rapid voltage increases which in turn cause cell overheating and abnormally rapid anode consumption. It is therefore necessary to maintain the bath concentration of alumina as nearly constant as possible to avoid the consequences of increases in resistance. This, of course, requires the frequent addition of alumina referred to above. The manner of addition is also potentially troublesome since typically it takes several minutes to dissolve the alumina as it passes into and through the molten bath. Incomplete dissolution can result in the alumina settling onto or through the molten aluminum and thus contaminate the product. To offset this tendency, frequent additions of alumina, usually every few hours, are necessary.

Accordingly, the present commercial production of aluminum involves the use of a large number of individual electrolysis cells which are all subject to individual variations and which therefore function independently of one another. Each has different operating characteristics and must be independently tended by operating personnel. For example, such operations as anode adjustment, replacement of anodes, feeding of anode paste, removal of product, charging of alumina and electrolyte salts, and the like, must be done individually and usually sporadically at unpredictable times as required. The non-uniformity of operation then results in high labor costs and maintenance.

In accordance with the present invention, these disadvantages and objectionable features of the current practice are largely eliminated or at least greatly minimized in a continuous process wherein a number of cells are operated in a continuous manner as more particularly described hereinafter.

The invention will be further understood by considering the accompanying drawings wherein:

FIG. 1 is a flow sheet illustrative of the process of the invention with the various processing components shown more or less diagrammatically, and FIG. 2 is a sectional elevation view of one of the electrolysis cells illustrating the structural details thereof.

Referring to FIG. 1, a feed solution is formed in charging cell 15 by directing alumina, as at 10, together with other materials, as at 11, which are added to replenish or adjust the electrolyte, natural or synthetic cryolite for example, from hoppers 12 and 13, respectively, over conveyor 14 into said cell 15, wherein the fluorides are melted and the alumina dissolved therein. Circulating electrolyte solution from electrolysis cells, as explained hereinafter, is combined with and becomes part of said feed solution in said cell. Charging cell 15 is equipped with spaced electrodes 16 and 17 energized from an A.C. source 16a to provide electrical resistance heating means for heating the electrolyte and maintaining it in a molten state. Spaced carbon electrodes 18 and 19 extend into the molten bath and are energized from a low voltage D.C. source (not shown) up to about 2 volts or so thereby to purify the melt of oxide impurities having a lower decomposition potential than alumina.

The charging cell 15 receives conduit 20 a circulating flow of depleted electrolyte melt from a plurality of electrolysis cells $E_1$–$E_x$, as well as fresh alumina and other electrolyte materials from conveyor 14 as explained above. The electrolytic process occurring in cells $E_1$–$E_x$ converts the dissolved alumina in the molten cryolite bath to elemental aluminum and oxygen and thus reduces the alumina content of the melt. The thus depleted melt is fed to charging cell 15 as explained hereinafter and therein enriched with alumina and electrolyte salts as needed from hoppers 12 and 13. These materials are added via conveyor 14 in controlled amounts and at such rates as to maintain a desired alumina content in the electrolyte bath. Convenient levels of alumina are of the order of 2–6% based on the weight of the entire melt. Conventional control means on the A.C. heating control circuit are employed to control the feed rate of alumina and the temperature of the recirculating electrolyte flow.

The alumina replenished electrolyte from charging cell 15 is introduced, as by pumping for example from pump 21a, at controlled temperature and composition through conduit 21 into an enclosed, thermally and electrically insulated inclined feeder launder 23 disposed along and above electrolysis cells $E_1$–$E_x$. Electrolyte is introduced into these cells via a series of conduits $F_1$–$F_x$ extending downwardly from feeder launder 23 to a point below the level of molten electrolyte in the electrolysis cells $E_1$-$E_x$. Either continuous or intermittent feeding may be employed, but it is preferred to employ intermittent feeding using small quantities at short intervals to aid in avoiding electrical shorting between cells.

As electrolyte is being fed sub-surface as above described, the electrolytic process is being carried out in the cells via connection of the anodes and cathodes (not shown in FIG. 1) to a suitable direct current source. Introduction of fresh electrolyte displaces partially depleted electrolyte which overflows via conduits $O_1$-$O_x$ extending from each cell into overflow launder 22. The overflow launder 22 is disposed at an inclination opposite to that of feeder launder 23, is thermally and electrically insulated and collects all overflow from the cells for introduction first into conduit 20 and then into charging cell 15 therein to be replenished as above described. Optional connecting means 26 between launders 22 and 23 is provided to accommodate surplus feed material from charging cell 15 over and above what is needed for electrolysis cell replenishment. The electrolytic action reduces the alumina to aluminum which accumulates as a molten pool in the bottom of each cell. The higher specific gravity of molten aluminum relative to that of the electrolyte solution at operating temperature permits the aluminum to settle to the bottom of the cell and since its melting point (around 660° C.) is lower than the operating temperature of the cell, it accumulates as a liquid. The molten aluminum is periodically withdrawn from the cells via product conduits $P_1$-$P_x$ into manifold 24 from where it is directed to storage, ingot forming, electrolytic refining or other use as desired. Carbon dioxide and carbon monoxide gases produced as a result of the interaction of carbon anodes with evolved oxygen are directed via a hood or other removal source represented by conduits $G_1$-$G_x$ extending from anode ports in each cell (not shown) to manifold 25 thence to be directed to further processing or discarded as desired.

Referring now to FIG. 2, there is shown therein an electrolysis cell $E_1$ which is representative of the electrolysis cells used herein. The cell comprises an outer shell 30 suitably of heavy duty material such as steel or iron, and an inner liner 31 of carbon. The carbon liner initially acts as cathode via direct current activation of plate 32. Conduit $F_1$ extending from feeder launder 23 dips into molten electrolyte bath 37 at a point below the frozen crust of electrolyte 37a. Conduit $O_1$ is provided from overflow port 38 located below the frozen crust 37a and provides the means for receiving displaced electrolyte forced out by introduction of fresh electrolyte from conduit $F_1$, and for directing the displaced electrolyte back to charging cell 15 via overflow launder 22.

Cell $E_1$ is equipped with an electrical and heat insulating top cover 33 provided with anode ports through which pass carbon anodes 34. Cover 33 is also provided with various venting ports (not shown) to permit the escape of gaseous decomposition products which are thence led through appropriate removal means ($G_1$-$G_x$ in FIG. 1).

Product removal port 36 is provided in cell $E_1$ and extends through shell 30 and carbon liner 31 into the inner cavity of $E_1$ to provide removal means for molten aluminum. As indicated hereinabove, molten aluminum collects at the bottom of the cell in consequence of the cathodic character of the carbon liner 31 and as it builds in volume, itself becomes the cathode. Intermittent partial removal of the pool through port 36 is preferred so as to minimize electrical drains on the system. A thermally and electrically insulating seal (not shown) is provided in $P_1$ connecting with port 36 to permit interruption of aluminum flow. Anodes 34 therefore are preferably adjustably mounted on a bus bar (not shown) so that they may be lowered into the bath as desired.

Molten electrolyte bath 37 as it is electrolyzed represents a changing composition, the levels of which are maintained within certain ranges by the process of the invention. The main constitutent of the bath is fused cryolite, either natural or synthetic, which acts as the solvent for the alumina, and has a melting point of about 1000° C. The bath preferably additionally contains amounts of other fluorides, such as calcium, sodium, potassium or lithium fluorides. Other bath compositions may be employed provided the specific gravity of the molten bath is less than that of molten aluminum. The amount of alumina supplied is conveniently between 2 and 6 percent. Efficient electrolysis of such baths occurs at temperatures of between 900–1000° C. The solvent bath itself is not appreciably decomposed by the electrolysis, but over long periods of time, it becomes necessary or desirable to add additional salts. Enrichment may be effected via appropriate charging from hoppers 12 and 13 (FIG. 1) to charging cell 15.

It is a feature of the invention that for a given size of cell, the practice of the process as herein described substantially minimizes the variability and frequency in labor consuming tasks such as adjusting anodes, breaking frozen electrolyte crust and the like so as to permit the use of increased amperage per cell per unit time over and above what is usually employed in prior art processes.

Since the process of the invention is both electrical and thermal, it will be appreciated by those skilled in the art that the various conduits, launders, pipes, vessels and the like should be insulated both thermally and electrically as appropriate. Additionally, auxiliary heating means may be provided where thermal insulation is insufficient or where otherwise desirable.

There has thus been described a method for electrolytically producing elemental aluminum in a series of electrolysis cells from a continuously circulating melt. Employing such a system, it is possible to obtain the benefit of having all cells operate on substantially the same electrolyte composition under substantially the same conditions, eliminate lag time in achieving alumina dissolution in the electrolyte under electrolysis conditions and reduce the operating and labor costs in consequence of the regularity of operation permitted by the process.

What is claimed is:

1. A method for the continuous production of elemental aluminum, which comprises forming in a charging cell a feed solution of alumina in a molten solvent bath comprising aluminum fluoride and sodium fluoride, distributing a portion of said feed solution into a plurality of electrolysis cells having overflow means for establishing and maintaining said solution in said cells, electrolyzing said solution to form molten aluminum and gaseous decomposition products and to result thereby in an electrolyzed solution which is partially depleted in alumina, withdrawing said gaseous decomposition products and a portion of said molten aluminum from said electrolysis cells, introducing additional feed solution into said electrolyzed solution thereby to displace a portion of said electrolyzed solution into said overflow means and form thereby an overflow solution, and recycling said overflow solution to said charging cell therein to be admixed with and to form part of said feed solution, said electrolyzed solution having a specific gravity less than that of molten aluminum at the temperature of electrolysis.

2. The method according to claim 1 wherein the introduction of said feed solution into said electrolyzed solution is effected intermittently.

3. The method according to claim 1 wherein said molten aluminum is withdrawn intermittently.

4. The method according to claim 1 wherein the sodium fluoride and aluminum fluoride are in the form of natural or synthetic cryolite.

5. The method according to claim 1 wherein said molten solvent bath additionally contains at least one of the salts calcium fluoride, sodium fluoride, potassium fluoride or lithium fluoride.

6. The method according to claim 1 wherein said feed solution in said charging cell is electrolyzed at a direct current potential lower than that which will electrolyze the alumina to decompose thereby electrically decomposable oxides, and removing the gaseous decomposition products.

7. The method according to claim 5 wherein the alumina content of said feed solution is between 2 and 6 percent by weight based on the entire weight of the molten solution and said molten solvent comprises $AlF_3$, NaF, and $CaF_2$.

References Cited

UNITED STATES PATENTS

| | | | |
|---|---|---|---|
| 1,643,610 | 9/1927 | Rosenzweig | 204—67 |
| 2,231,030 | 2/1941 | Scofield et al. | 204—67 |
| 2,451,490 | 10/1948 | Johnson | 204—67 |

JOHN H. MACK, Primary Examiner

D. R. VALENTINE, Assistant Examiner

U.S. Cl. X.R.

204—244